United States Patent [19]

Li et al.

[11] Patent Number: 5,654,353
[45] Date of Patent: Aug. 5, 1997

[54] BIODEGRADABLE COMPOSITION, A PROCESS FOR PREPARING THE SAME AND THE USE THEREOF

[75] Inventors: Yunzheng Li; Haojun Zhu; Jianguang Sun; Anhua Li, all of Beijing, China

[73] Assignee: Beijing Xingchen Modern Control Engineering Institute, China

[21] Appl. No.: 450,181

[22] Filed: May 25, 1995

[30] Foreign Application Priority Data

May 27, 1994 [CN] China .................. 94105861.1

[51] Int. Cl.⁶ .................. C08L 89/06; C08L 101/00; C09H 9/02; B29C 45/00
[52] U.S. Cl. .................. 524/47; 524/49; 524/50; 524/51; 524/52
[58] Field of Search .................. 524/47, 49, 50, 524/51, 52

[56] References Cited

U.S. PATENT DOCUMENTS

| | | |
|---|---|---|
| 4,133,784 | 1/1979 | Otey et al. .................. 524/52 |
| 4,293,539 | 10/1981 | Ludwig et al. . | |
| 5,384,170 | 1/1995 | Bastioli et al. .................. 428/34.1 |

FOREIGN PATENT DOCUMENTS

| | | |
|---|---|---|
| 0409789 | 1/1991 | European Pat. Off. . |
| 2058808 | 9/1980 | United Kingdom . |
| 9102023 | 2/1991 | WIPO . |

*Primary Examiner*—Nathan M. Nutter
*Attorney, Agent, or Firm*—Skadden, Arps, Slate, Meagher & Flom, LLP; Evelyn M. Sommer, Esq.

[57] ABSTRACT

The present invention relates to a degradable starch resin composition, a process for preparing the same and the use thereof. Said composition comprises starch, synthetic resin, mixing promoter, plasticizer, degradation accelerator and other additives. Said process comprising: (a) selecting a biodegradation accelerator; (b) preparing modified starch concentrate; (c) extruding the modified starch, EAA and the synthetic resin in a double-screw extruder and pelleting to obtain the degradable starch resin. The composition of the present invention contains a biodegradation accelerator and its starch content can be up to 80%. Having excellent biodegradability and good physico-mechanical property, the composition is particularly suitable to be used to prepare various light or heavy packaging films and agricultural films, etc.

16 Claims, No Drawings

BIODEGRADABLE COMPOSITION, A PROCESS FOR PREPARING THE SAME AND THE USE THEREOF

FIELD OF THE INVENTION

The present invention relates to a biodegradable composition, a process for preparing the same and the use thereof. The present invention particularly relates to a degradable starch-resin composition, a process for preparing the same and the use thereof.

BACKGROUND OF THE INVENTION

Biodegradable resins can generally be classified into two types. One is the polymers or copolymers of hydroxy acids having the property of biodegradability which are synthesized through biological or chemical methods, such as poly 3-hydroxy butyrate (PHB). The advantage of this type of materials is that they can be completely biodegraded. However, because of the limits of the source of raw materials and the synthetic processes, these products are very expensive whose price is several times or even tens times of that of normal plastics. Furthermore, when they are processed into thin films, they have small elongation, and the products are very fragile, such as the products described in GB2058808 and U.S. Pat. No. 4,293,539. Therefore, they can only be suitable to special use. The other one is the blend of biodegradable natural products with synthetic resins, wherein the natural products provide the biodegradability, whereas the synthetic resins provide various mechanical and processing properties required during the application. The natural products often used are starch, cellulose and other polysaccharide and their derivatives. The synthetic resins can be polyethylene, polypropylene, polystyrene, polyvinyl chloride, etc. Starch is widely used because of its wide source, regeneration ability and low cost. The processes for the preparation of degradable starch resin using starch and synthetic resins can further be classified into three types: one is to prepare said degradable starch resins by using starch and hydrophilic synthetic resins, such as polyvinyl alcohol and copolymer of ethylene and ethenol, and other additives (for example WO9102023). Such resins prepared thereby have good biodegradability but poor water resistance, and the property of products is largely influenced by environmental moisture, the processing property is also poor; the second one is to prepare said degradable starch resins by treating dry starch with organosilicon compounds and titanate, converting starch from hydrophilic material into hydrophobic material, followed by blending with synthetic resins. This process is simple, and the processing techniques and equipments of the product can be those as used during the processing of synthetic resins. However, the starch content in final product is only in the range of 6–16%. In most cases, the starch content in the final products is below 10%. When starch content is high, the product could not be used because of the poor mechanical property, when starch content is low, the degradability is very poor; the third one is to prepare said degradable starch resins by mixing starch, polyethlene, mixing promoter (EAA) and plasticizer and the like, dextrinizing starch in the presence of outside water, blending it with polyethylene and EAA, removing additional water by extruding, and pelleting. The characteristic of this process is that the dextrinizing and blending of the starch is completed simultaneously and it makes possible to apply wet starch (for example EP 0409789A2). However, the starch content in the degradable starch resins produced by this process is not high, and when the starch content is higher than 25%, the mechanical property of the products is poor and the processing and application of the products are largely influenced by moisture. Thinner films could not be obtained when blowing, and the transparency is not good. It has been demonstrated by our study that the film obtained by such process has a thickness of above 50 μm. It will soon become fragile upon the storage under dry environment, the elongation dropped abruptly, and the thermal fusion property is bad. It has been found under the observation of electronic microscope that the grain size of starch dispersed in polyethylene is in the range of 30–50μ and the dispersity is poor. Starch is a strong polar macromolecular material, and it has strong intermolecular and intramolecular hydrogen bonds, while polyethylene is non-polar polymer. Therefore, the critical point for this technique is to improve the compatibility between starch and polyvinyl resins. Furthermore, when such blend is manufactured into products, it is likely to appear pores during blowing as a result of the different fluidity of starch and synthetic resins. In prior art, it mainly use EAA as a mixing promoter. However, it is indicated by research that EAA is only partly compatible with starch and their mixing substantially belongs to physical mixing. Additionally, the applied water which is added to dextrinize starch actually functions to separate vinyl resin and starch. Therefore, it affects the dipersion of starch in polyvinyl resin. After the water content in starch is volatiled, the starch will recrystallize, making the grain size of dispersed starch too large which in turn affects the thickness and strength of the film and restrains the amount of starch.

In EP patents, starch with small grain size can be obtained by first reducing the grain size of starch through the action of microbes or enzymes, then emulsifying with vegetable oil, coating and spray drying. The amount of starch is therefore increased. But the process is very complicated. Actually among many techniques disclosed heretofore, when the starch content is higher than 30%, the mechanical property of the product is much worse as compared with normal plastics. Hence, it is very difficult to produce film products having practical value.

In addition, in prior art, the influence to the preparation of resin blend by the molecular property of polyethylene is often neglected, only its function of being the plastic material to provide thermal forming and mechanical property is emphasized.

As is described above, in prior art, biodegradable resin composition, especially degradable starch resin composition with low cost, good biodegradability and good applying property has not been obtained yet.

OBJECTS OF THE INVENTION

Therefore, one object of the present invention is to provide a biodegradable composition, particularly a degradable starch resin composition.

Another object of the present invention is to provide a process for the preparation of said biodegradable composition, particularly said degradable starch resin composition.

A further object of the present invention is to provide a resin film product produced by said biodegradable composition, particularly by said degradable starch resin composition.

SUMMARY OF THE INVENTION

According to one aspect of the present invention, the present invention provides a degradable starch resin composition, comprising:

(a) 30–80% by weight of modified starch concentrate having the following composition:
50–85% by weight of starch;
4–16% by weight of mixing promoter;
10–30% by weight of plasticizer;
1–4% by weight of alkaline additive;
0.5–1.5% by weight of biodegradation accelerator;
(b) 5–20% by weight of copolymer of ethylene and acrylic acid;
(c) 10–60% by weight of polyvinyl resin.

According to another aspect of the present invention, it provides a process for the preparation of the degradable starch resin composition which comprises the following steps:

(a) selecting biodegradation accelerator:
*Bacillus subtilis* with high temperature resistance and high stability, e.g., *Bacillus subtilis* BF7864 (obtained from Central China Agricultural University), being selected as a strain of biodegradation accelerator;
inoculating the selected strain into a fermentator from a culture flask, fermenting for 65–75 hours at 37° C., and then adding starch thereto, drying the obtained mixture by spray drying to a state of powder, thus obtaining the biodegradation accelerator containing bioactive agent;

(b) preparing modified starch concentrate:
mixing starch, mixing promoter, plasticizer, alkaline additive and biodegradation accelerator according to the proportion described above and extruding the obtained mixture in a single-screw extruder to obtain modified starch concentrate;

(c) preparing biodegradable starch resin particles:
mixing the above-described modified starch concentrate, copolymer of ethylene and acrylic acid and polyvinyl resins in a certain proportion, extruding the obtained mixture in a double-screw extruder, removing additional water.

The present invention has gained satisfactory result. The starch content in the composition obviously increases, which can be up to about 80%. It has good processing property and can readily be blown into thin film by conventional blowing equipment, with a film thickness in the range of 10–12 μm. It is indicated by electronic microscope analysis that the size of dispersed starch particle is below 5 μm. Also, it won't appear the separating phenomenon of starch and resin even though being processed several times under the temperature of 150° C.–180° C. The mechanical property of the product is good. The main performance of the film containing 60% of starch is similar to that of normal LDPE. The addition of degradation accelerator has greatly improved the degradation rate and the degree of degradation of the composition.

DETAILED DESCRIPTION OF THE INVENTION

The present invention relates to a biodegradable starch resin composition, comprising:

(a) 30–80% by weight of modified starch concentrate having the following composition:
50–85% by weight of starch;
4–16% by weight of mixing promoter;
10–30% by weight of plasticizer;
1–4% by weight of alkaline additive;
0.5–1.5% by weight of biodegradation accelerator;
(b) 5–20% by weight of copolymer of ethylene and acrylic acid;
(c) 10–60% by weight of polyvinyl resin.

According to the present invention, said starch can be corn starch, potato starch, sweet potato starch, oxidized starch, cationic starch, anion starch and acetic starch, with a water content below 14%. The addition amount of starch in the modified starch concentrate is in the range of 50–85% by weight.

Said mixing promoter includes two constituents, one is a copolymer of ethylene and acrylic acid (EAA), whose function in said modified starch concentrate is to increase the fluidity, reduce the grain size of starch and increase the compatibility between starch and polyvinyl resin. The acrylic acid content in EAA is in the range of 5–25% by weight, preferably in the range of 10–20% by weight. The melt index of EAA is more than 35 g/10 min, and its addition amount in the modified starch concentrate is in the range of 1–6% by weight, preferably in the range of 3–5% by weight. The other constituent is epoxy vegetable oil, such as epoxy soybean oil, epoxy corn oil, etc., whose addition amount in the modified starch concentrate is in the range of 3–10% by weight. Under the processing conditions, epoxy vegetable oil can react with starch, making the starch graft and crosslink, at the same time it can also link the starch with EAA through chemical reaction, thus greatly reduce the hydrophilicity of starch, so that the compatibility of starch with polyvinyl resin is improved and the addition amount of the starch is increased. Furthermore, it can also regulate the melt fluidity of starch particles, making it well match with polyvinyl resin, which is a main reason to reach the effect of the present invention.

Said plasticizer is glycol, propanediol and the low molecular weight condensate thereof (MW<400), glycerin and sorbitol and the like, wherein the glycerin is preferable. Its addition amount is in the range of 10–30% by weight based on the weight of the modified starch concentrate, its purity is more than 99%.

Said alkaline additive is hydroxy compounds of alkali metals such as sodium hydroxide and potassium hydroxide, urea, triethanolamine and the like, wherein NaOH is preferably used. Its addition amount is in the range of 1–4% by weight. The functions of the additive are to reduce the melting temperature of starch and to lower the grain size of starch.

In the composition of the present invention, the acrylic acid content in said copolymer of ethylene and acrylic acid is in the range of 10–20% by weight, its melt index is more than 35 g/10 min. The addition amount of said copolymer is in the range of 5–20% by weight of the composition, preferably in the range of 10–20% by weight.

In the starch resin, there is always a contradiction between the addition amount of starch and mechanical strength, i.e., the contradiction between the degradation rate and mechanical strength of the starch resin composition. In view of this, said biodegradation accelerator according to the present invention is a bioactive agent such as *Bacillus subtilis*, including *Bacillus subtilis* BF7864 (available from Central China Agricultural University) which has the property of high temperature resistance and stability of storage. Other types of *Bacillus subtilis* having the property of high temperature resistance and stability of storage can also be used. Owing to the addition of the *Bacillus subtilis* having the property of high temperature resistance and stability of storage into the biodegradation composition of the present invention, when its products are disposed to the environment suitable for the growing and reproduction of microbes, degradation will occur first in the place where the stress is concentrated because of the presence of the biodegradation accelerator, thus the procedure of biodegradation is accelerated and the degree of degradation is greatly increased. As described above, in prior art, the influence of the molecular property of polyethylene to the preparation of the blend is usually neglected, only its function being plastic material to provide thermal forming and mechanical properties is emphasized. The inventors of the present invention have found through research that the selection of polyvinyl resin has a deep influence on obtaining products with good mechanical properties, it also has unexpected effects on improving the compatibility with starch and increasing the addition amount of starch.

Therefore, according to the present invention, said polyvinyl resin is a mixture of two different types of polyvinyl resins. One is the conventional polyethylene such as low density polyethylene(LDPE), high density polyethylene (HDPE), wherein the strength of LDPE is more than 12 Mpa, the elongation is in the range of 500–200%, the melt index is in the range of 5–7 g/10 min, while the strength of HDPE is more than 30 Mpa, the melt index is in the range of 2–5 g/10 min. The other is a special type of polyvinyl resin with a density in the range of 0.86–0.90 g/cm$^3$, a melt index in the range of 2–5 g/10 min and a melting temperature in the range of 80°–100° C. It has little random branches. The selection of such polyvinyl resin has important effect on the increase of the addition amount of starch and the physico-mechanical property of the degradable starch resin composition particularly the increase of its tear resistance strength. In accordance with the present invention, the weight ratio of said conventional polyvinyl resin and said special type of polyvinyl resin is in the range of 80–20:20–80. The addition amount of said mixture of polyvinyl resins is in the range of 10–60% by weight, preferably in the range of 20–55% by weight.

The process for the preparation of the degradable starch resin composition according to the present invention comprises the following steps:

(a) selecting biodegradation accelerator:
Bacillus subtilis with high temperature resistance and high stability, e.g., Bacillus subtilis BF7864 (obtained from Central China Agricultural University), being selected as a strain of biodegradation accelerator;
inoculating the selected strain into a fermentator from a culture flask, fermenting for 65–75 hours at 37° C., and then adding starch thereto, drying the obtained mixture by spray drying to a state of powder, thus obtaining the biodegradation accelerator containing bioactive agent;

(b) preparing modified starch concentrate:
mixing starch, mixing promoter, plasticizer, alkaline additive and biodegradation accelerator according to the proportion described above, extruding the obtained mixture in a single-screw extruder to obtain a modified starch concentrate;

(c) preparing biodegradable starch resin particles:
mixing above-obtained modified starch concentrate, copolymer of ethylene and acrylic acid and polyvinyl resins in a certain proportion, extruding the obtained mixture in a double-screw extruder, removing additional water to obtain homogeneous particles of the biodegradable starch resin composition.

According to the process of the present invention, said starch can be corn starch, potato starch, sweet potato starch, oxidized starch, cationic starch, anion starch and acetic starch, with a water content below 14%. The addition amount of starch in the modified starch concentrate is in the range of 50–85% by weight.

According to the process of the invention, said mixing promoter includes two constituents. One is a copolymer of ethylene and acrylic acid (EAA), whose function in said modified starch concentrate is to increase the fluidity of the composition, to reduce the grain size of the starch thereof and to increase the compatibility between starch and polyvinyl resin. The EAA used can be those EAA with a acrylic acid content in the range of 5–25% by weight, preferably in the range of 10–20% by weight. The melt index of EAA is more than 35 g/10 min, and its addition amount in the modified starch concentrate is in the range of 1–6% by weight, preferably in the range of 3–5% by weight of the modified starch concentrate. The other constituent is epoxy vegetable oil, such as epoxy soybean oil, epoxy corn oil, etc., whose addition amount in the modified starch concentrate is in the range of 3–10% by weight. Under the processing conditions, epoxy vegetable oil can react with starch, causing the starch to graft and crosslink. At the same time it can also link the starch with EAA through chemical reaction, thus greatly reduce the hydrophilicity of starch, so that the compatibility of the starch with polyvinyl resin is improved and the addition amount of the starch is increased. Furthermore, it can also regulate the melt fluidity of the starch particles, making it well match with polyvinyl resins, which is a main reason to reach the effect of the present invention.

According to the process of the present invention, said plasticizer is glycol, propanediol and the low molecular weight condensate thereof(MW<400), glycerin and sorbitol and the like, wherein the glycerin is preferable. Its addition amount is in the range of 10–30% by weight of the modified starch concentrate and its purity is more than 99%.

According to the process of the present invention, said alkaline additive is hydroxy compounds of alkali metals such as sodium hydroxide and potassium hydroxide, urea, triethanolamine and the like, wherein NaOH is preferably used. Its addition amount is in the range of 1–4% by weight. The effects of the additive are to reduce the melting temperature of the starch and to promote the lowering of the grain size of starch.

According to the process of the present invention, said biodegradation accelerator is a bio-active agent such as Bacillus subtilis, including Bacillus subtilis BF7864 (available from Central China Agricultural University) which has the property of high temperature resistance and stability of storage. According to the process of the invention, the biodegradation accelerator Bacillus subtilis such as Bacillus subtilis BF7864 has the starch as its carrier, it can be added into the modified starch concentrate to obtain the above-described composition.

According to the process of the present invention, said polyvinyl resin is a mixture of two different types of polyvinyl resin. One is the conventional polyethylene such as LDPE, HDPE, wherein the strength of LDPE is more than 12 Mpa, the elongation is in the range of 500–200%, the melt index is in the range of 5–7 g/10 min, while the strength of HDPE is more than 30 Mpa, the melt index is in the range of 2–5 g/10 min. The other one is a special type of polyvinyl resin with a density in the range of 0.86–0.90 g/cm$^3$, a melt index in the range of 2–5 g/10 min and a melting temperature in the range of 80°–100° C. It has little random branches. The selection of such polyvinyl resin has important effect on the increase of the addition amount of starch and the physico-mechanical property of the degradation starch composition, particularly the increase of its tear resistance strength. In accordance with the present invention, the weight ratio of conventional polyvinyl resin and said special polyvinyl resin is in the range of 80-20:20-80. The addition amount of said mixture of polyvinyl resins is in the range of 10-60%, preferably in the range of 20-55% by weight of the composition.

In accordance with the process of the present invention, the biodegradable starch resin particles are obtained by mixing, melting, blending, extruding and pelleting in a double-screw extruder under such conditions as that the processing temperature being in the range of 130°-190° C., preferably in the range of 135°-170° C., the rotating rate of the screw being in the range of 250-400 rpm, and the torsional moment being in the range of 50-90%.

According to the present invention, said biodegradation accelerator can also be added during the application of the biodegradable starch resin composition of the present invention, such as during the procedure of preparing it into film products, thus a composition having the following composition is obtained:

(a) 30-80% by weight of modified starch concentrate having the following composition:
50-85% by weight of starch;
4-16% by weight of mixing promoter;
10-30% by weight of plasticizer;
1-4% by weight of alkaline additive;
(b) 5-20% by weight of copolymer of ethylene and acrylic acid;
(c) 10-60% by weight of polyvinyl resin;
(d) 0.15-1.2% by weight of biodegradation accelerator.

The present invention also relates to the use of the biodegradable starch resin composition according to the present invention. The composition can be processed into products by the conventional equipment used for the processing of LDPE and HDPE, for example film products such as agricultural film, film packaging bags for daily use and other packaging films, etc. The products have good mechanical property and biodegradability.

As described above, the present invention has improved the compatibility between the starch and the polyvinyl resins in two aspects, and it also causes the fluidities of starch particles and polyvinyl resins becoming adapted. (1) In addition to EAA, epoxy vegetable oils which can react with starch and EAA are added. And in the absence of applied water, the starch is made to convert from crystalline form into amorphous form, and the recrystallizing is prevented by the use of additives. Thermoplastic modified starch particles are obtained by the conversion under high temperature and high pressure. Such particles have good compatibility with polyvinyl resins and the optimal fluidity match under processing condition can be obtained by the control of proportion and technical condition. (2) The above-described special polyvinyl resins have been used in the present invention. These polyvinyl resins have longer molecular chain with a low content of branches, low crystallinity and good fluidity. The specialty of its molecular chain makes it easy to form highly stable system with the starch molecules. Therefore, the starch is likely to disperse in it. It is the first time to use such kind of polyvinyl resin in the present invention, and a good result has been obtained.

A biodegradation accelerator is also added into the composition of the present invention. When its products are disposed to the environment suitable for the growing and reproduction of microbes, because of the presence of the biodegradation accelerator, degradation will occur first in the place where the stress is concentrated thus accelerating the procedure of biodegradation and greatly increasing the degree of degradation.

It is indicated by study that when starch is heated under normal pressure, it will carbonize because of the dehydration between molecules. Therefore, starch does not has thermoplasticity under normal conditions. However, under high pressure, the crystalline structure of the starch having a natural water content (14-16%) is damaged, and it becomes a melt and thus has the thermoplasticity. In the present invention, in order to improve the compatibility between starch and non-polar synthetic polymers and to reduce the grain size of starch in the composition, EAA and epoxy vegetable oils and other additives are added, and modified starch is obtained by high temperature and high pressure treatment.

The biodegradable resin composition of the present invention has the following characteristics:

(a) high starch content: the addition amount of the modified starch concentrate is up to 80%, and excellent physico-mechanical property. This can not be achieved by prior art.

(b) easy to be moulded: it can be blown into films by conventional equipment and the technique is easy to control. Since the affect of moisture has been eliminated, and the fluidity of the modified starch matches with that of the polyvinyl resins, therefore bubbles will not appear during blowing. Homogeneous film with a thickness of 10-12 μm can be obtained. The film has good thermal fusion property and storage stability.

(c) good mechanical property: its physico-mechanical property is similar to that of high pressure polyethylene.

(d) good degradability: the product has excellent biodegradability because of high starch content and the activity of degradation accelerator.

The present invention will be described in further detail with the following examples.

EXAMPLE 1

(I) The preparation of biodegradation accelerator

*Bacillus subtilis* BF7864 (available from Central China Agricultural University) with high temperature resistance and high stability was selected as the strain of biodegradation accelerator. The strain was inoculated into a tube with a medium composition as Peptone 1.0% Beef extract 0.5% Agar 2.0% pH=7.0. Then it was inoculated into a culture flask slant with a fermentation medium composition as Peptone 1.6% Beef extract 0.8% Sodium chloride 0.5% pH=7.0.

After culturing for about 72 hours; it was stored in a 4° C. refrigerator.

Two slants were inoculated into a 7 tons fermentator, After fermenting for 65-75 hours at 37° C., 1 ton of starch was added then the mixture was dried into powder by spray drying, thus the degradation accelerator containing bioactive agent was obtained.

(II) The preparation of the modified starch concentrate:

75% of starch, 2.0% of EAA, 4.6% epoxy soybean oil, 15% of glycerin, 2.5% of urea and 0.89% of above biodegradation accelerator were mixed thoroughly, then the mixture was extruded in a single-screw extruder. The extrusion conditions were as follows:

single-screw extruder L/D=20 rotating rate: 150 rpm temperatures: region 1 90° C. region 2 100° C. region 3 120° C. region 4 130° C. region 5 120° C.

(III) The preparation of biodegradable starch resin composition particles:

54% of above-obtained modified starch concentrate, 9% of EAA, 20% of LDPE and 17% of EPP (manufactured by EXXON CO., d=0.9 g/10 min.) were mixed thoroughly, then the mixture was extruded in a double-screw extruder, in the meanwhile additional water was removed under vacuum, thus translucent and homogeneous particles were obtained. The extrusion conditions were as follows:

double-screw extruder: ZSK-58 building blocks-type double-screw extruder rotating rate: 310 rpm torsional moment: 70–80% temperatures: region 1 115° C. region 2 140° C. region 3 140° C. region 4 138° C. region 5 138° C. region 6 135° C. melt 140°–150° C.

degree of vacuum: 100 mmHg (IV) particles:

appearance: yellowish, translucent density: 1.15–1.20 g/cm$^3$ water content: 1.2–1.5% melt index: 1.5–2.0 g/10 min (V) blowing test film test blowing machine: D=45 mm, L/D=30 blow ratio: 4 index ratio: 6–7 temperatures: region 1 125° C. region 2 135° C. region 3 145° C. region 4 150° C. die 155° C.

lay-flat width of the film: 40 cm (VI) mechanical properties tensile strength (longitudinal): 19.2 MPa (transversal): 16.8 MPa right angle tearing strength (longitudinal): 66.3N/mm (transversal): 83.5N/mm elongation at break (longitudinal): 400%

(transversal): 480%

EXAMPLE 2

The biodegradation accelerator, modified starch concentrate, biodegradable starch resin composition particles were prepared in the same manner as described in Example 1, and the blowing test was carried out in the same manner, except that the composition of the modified starch concentrate was: 70% by weight of corn starch, 20% by weight of glycerin, 5% by weight of epoxy soybean oil, 3% by weight of EAA, 1.5% by weight of biodegradation accelerator and 0.5% by weight of sodium hydroxide; the composition of biodegradable starch resin composition particles was: 70% by weight of starch concentrate, 9% by weight of EAA, 15% by weight of EEP and 6% by weight of 1F7B. The mechanical properties of the film prepared by the biodegradable starch resin composition particles of this example were:

tensile strength (longitudinal): 18.9 MPa (transversal): 16.4 MPa right angle tearing strength (longitudinal): 62.3 N/mm (transversal): 83.55/mm elongation at break (longitudinal): 350%

(transversal): 400[{]jf44aComparative Example (I) the preparation of starch concentrate:

Starch concentrate was prepared in the same manner of step (II) of Example 1, using 70% of corn starch, 25% of EAA and 5% of glycerin.

(II) the preparation of starch resin composition particles:

Starch resin composition was prepared in the same manner as step (III) of Example 1, using 30% of starch concentrate obtained above, 12% of EAA, 42% of LLDPE0209 and 16% of 1F7B.

(III) blowing test film test blowing machine: D=45 mm, L/D=30 blow ratio: 4 index ratio: 6–7 temperatures: region 1 125° C. region 2 135° C. region 3 145° C. region 4 150° C. die 155° C.

lay-flat width of the film: 40 cm (IV) mechanical properties tensile strength (longitudinal): 15 MPa (transversal): 13 MPa elongation at break (longitudinal): 400%

(transversal): 250%

What we claimed is:

1. A biodegradable starch resin composition comprising:
   (a) 30–80% by weight of modified starch concentrate having the following composition:

50–85% by weight of starch;

4–16% by weight of mixing promoter;

10–30% by weight of plasticizer;

1–4% by weight of alkaline additive;

0.5–1.5% by weight of biodegradation accelerator;

(b) 5–20% by weight of copolymer of ethylene and acrylic acid;

(c) 10–60% by weight of polyvinyl resin which is a mixture of conventional polyvinyl resin of low density polyethylene (LDPE) and high density polyethylene (HDPE) with a special polyvinyl resin with a density in the range of 0.86–0.90 g/cm$^3$, a melt index in the range of 2–5 g/10 min and a melting temperature in the range of 80°–100° C.

2. The composition according to claim 1, wherein said starch is corn starch, potato starch, sweet potato starch, oxidized starch, cationic starch, anion starch and acetic starch, with a water content below 14%, the addition amount of starch in the modified starch concentrate is in the range of 50–85% by weight.

3. The composition according to claim 1, wherein said mixing promoter is a mixture of a copolymer of ethylene and acrylic acid and epoxy vegetable oils.

4. The composition according to claim 3, wherein said copolymer of ethylene and acrylic acid has a acrylic acid content in the range of 5–25% by weight, its melt index is 35 g/10 min and its addition amount is in the range of 1–6% by weight of the modified starch concentrate.

5. The composition according to claim 4, wherein said copolymer of ethylene and acrylic acid has a acrylic acid content in the range of 10–20% by weight, its melt index is 35 g/10 min and its addition amount is in the range of 2–5% by weight of the modified starch concentrate.

6. The composition according to claim 3, wherein said epoxy vegetable oils are epoxy soybean oil and epoxy corn oil, their addition amount is in the range of 3–10% by weight of the modified starch concentrate.

7. The composition according to claim 1, wherein said plasticizer is glycol, propanediol and the low molecular weight condensate thereof (MW<400), glycerin and sorbitol, its purity is more than 99%, its addition amount is in the range of 10–30% by weight of the modified starch concentrate.

8. The composition according to claim 1, wherein said alkaline additive is hydroxy compounds of alkali metals such as sodium hydroxide and potassium hydroxide, urea, triethanolamine, its addition amount is in the range of 1–4% by weight of the modified starch concentrate.

9. The composition according to claim 1 wherein said conventional polyvinyl resin and said special polyvinyl resin in said mixture have a weight ratio in the range of 80–20:20–80.

10. The composition according to claim 9, wherein the addition amount of said mixture is in the range of 20–55% by weight.

11. A homogenous film product comprised of the biodegradable starch resin composition according to claim 1.

12. A biodegradable starch resin composition comprising:
(a) 30–80% by weight of modified starch concentrate having the following composition:
50–85% by weight of starch;
4–16% by weight of mixing promoter;
10–30% by weight of plasticizer;
1–4% by weight of alkaline additive;
0.5–1.5% by weight of biodegradation accelerator;
(b) 5–20% by weight of copolymer of ethylene and acrylic acid;
(c) 10–60% by weight of polyvinyl resin which is a mixture of conventional polyvinyl resin of low density polyethylene (LDPE) and high density polyethylene (HDPE) with a special polyvinyl resin with a density in the range of 0.86–0.90 g/cm$^3$, a melt index in the range of 2–5 g/10 min and a melting temperature in the range of 80°–100° C.;
(d) 0.15–1.2% by weight of biodegradation accelerator.

13. A homogenous film product comprised of the biodegradable starch resin composition according to claim 12.

14. A homogeneous film product comprised of the biodegradable starch resin composition according to claim 9.

15. The composition according to claim 1 wherein said biodegradation accelerator is *Bacillus subtilis* BF 7864.

16. The composition according to claim 1, wherein the strength of LDPE is more than 12 Mpa, the elongation is in the range of 500–200%, the melt index is in the range of 5–7 g/10 min, while the strength HDPE is more than 30 Mpa, the melt index in the range of 2–5 g/10 min.

* * * * *